United States Patent Office.

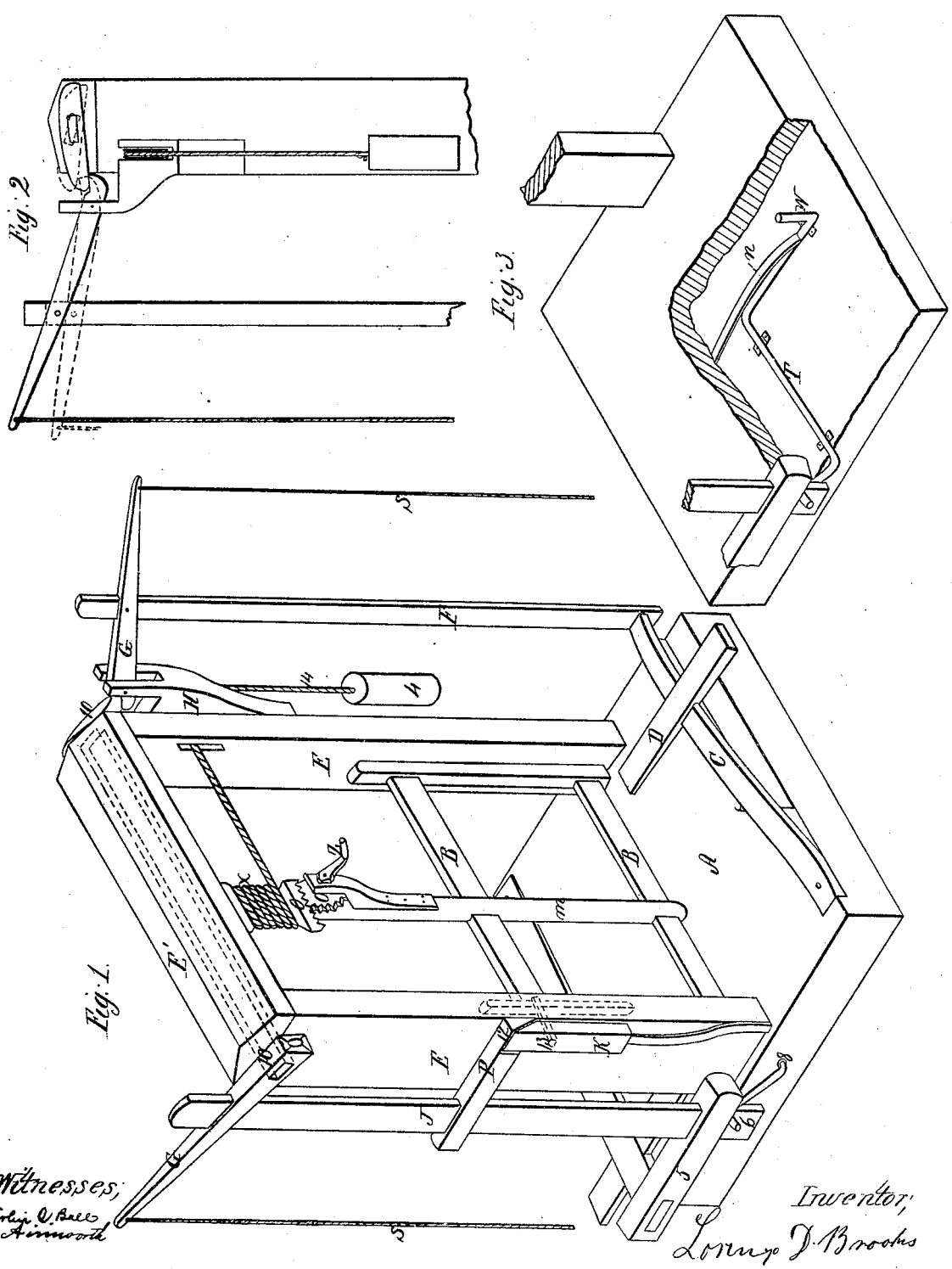

LORENZO D. BROOKS, OF SYENE, WISCONSIN.

Letters Patent No. 88,773, dated April 13, 1869.

IMPROVEMENT IN GATES.

The Schedule referred to in these Letters Patent and making part of the same.

*To all whom it may concern:*

Be it known that I, LORENZO D. BROOKS, of Syene, Dane county, State of Wisconsin, have invented certain Improvements in Gates; and I do declare the following is a full, clear, and exact description of the construction and operation of the same, reference being had to the annexed drawings, making a part of this specification, in which—

Figure 1 is a perspective view.
Figure 2 is a view of the end.
Figure 3 is a plan.

I construct a platform, A, of plank, sixteen feet square.

Into the central part of the platform A, at its right and left edges, I frame the posts E E, of the gate-frame, which posts are also framed into the top beam, E'.

I then construct my gate proper, consisting of the usual bars B B, framed into upright end-pieces, and at the centre passing through an upright shaft, M, which shaft is of sufficient length to reach from the platform A to the upper beam, E', at which points its ends are journalled in, so as to support and give rotary motion to the gate, the whole gate proper being of suitable length and height to fit into the outside frame E E, and to exclude ordinary animals.

Upon the right-hand side of the frame E, I place the attachment H, having in its upper end a pulley.

Over this pulley passes the rope 14, connected at its outer end to the weight 4, and at its inner end to the central shaft M, around which it is wound by working the geared wheels O O, with the crank Z, the upper geared wheel O being attached to a cylinder, working around the upper part of the shaft M, and which cylinder carries the rope 14, and when not being wound, is attached to the central shaft M, and revolves with it.

Through the top beam E', of the frame, I pass the shaft 10 10, projecting at each end.

Upon these ends I mortise the two arms G G, projecting, the one forward and the other backward from the frame, the one upon the right being broken, or hinged near the frame, so as to give a reverse motion, and cause the ends of the arms G G to rise and fall together, the arm G, at the right, being supported by a standard attached to the frame E.

Attached to the arms G G, near the frame, are the perpendicular pitmen J F, passing down to near the platform, where they support the levers C, with their transverse foot-pieces D D, the inner ends of which levers rest upon the platform A, and are attached so as to admit of their motion up and down at the ends attached to the pitmen J F.

On the left-hand side there rises, from near the platform A, the spring-block K, terminating near the centre of the frame E in the inclined plane 13, upon which is placed the wedge-shaped cross-bar P, mortised into the middle part of the pitman J.

To this block K is attached a pin, penetrating through the frame E, so as to hold the gate when in place.

To the extreme lower end of the pitman J is attached a crank, 6, connected with a rod, T, passing under the platform A, and having its inner end W raised through and above the platform at the point where the gate, at its front part, meets the centre of the platform in swinging open.

5 is an elbow of the lower end of the pitman J.

S S are cords, attached to the ends of the arms G G, and hanging down, so as to be reached in passing.

8 is the point where the crank 6 is connected with the rod T, at the edge of the platform.

X is the spring, holding the cylinder.

To operate my gate, having wound up the weight, and the same being kept wound as often as necessary, the driver, in passing, places the wheels of his vehicle upon the transverse foot-board D, which brings down the arm G, its fellow arm G also coming down by the turning of the shaft 10 10. This presses the wedge-shaped cross-bar P down the surface of the inclined plane, or slanting end of the block 13, withdrawing the pin connected with the block 13. The weight will now operate upon the gate, turning it one-fourth around, where it impinges upon the pin W, which is elevated by the downward motion of the pitman J. The gate remains in this position until the wheel is removed from the foot-board D, which occurs just before passing through with the rear wheel. The gate then commences again to revolve, by force of the applied weight, the point W being thrown down by a spring, n, above its arm T, which motion also elevates the pitmen J and F, and allows the spring K to insert the pin l for holding the gate while shut.

Coming from the other way, the action is the same.

The gate may also be operated by the strings S S, by hand.

The object of this invention is to provide an improved means for opening and closing a gate, of that class of gates which revolves on a central shaft, and it consists in the combinations hereinafter expressed of the devices described.

What I claim, is—

1. The parts C, D, F, G, 10, J, P, 12, K, and 13, when combined and arranged as set forth.

2. In combination with the elements of the first clause of claim, the levers T and W, and spring X.

3. In combination with the features of said first claim, the cord S, for the purpose specified.

LORENZO D. BROOKS.

Witnesses:
J. W. JOHNSON,
ALEX. S. HOOE.